Figures 1, 2, 3, 4:
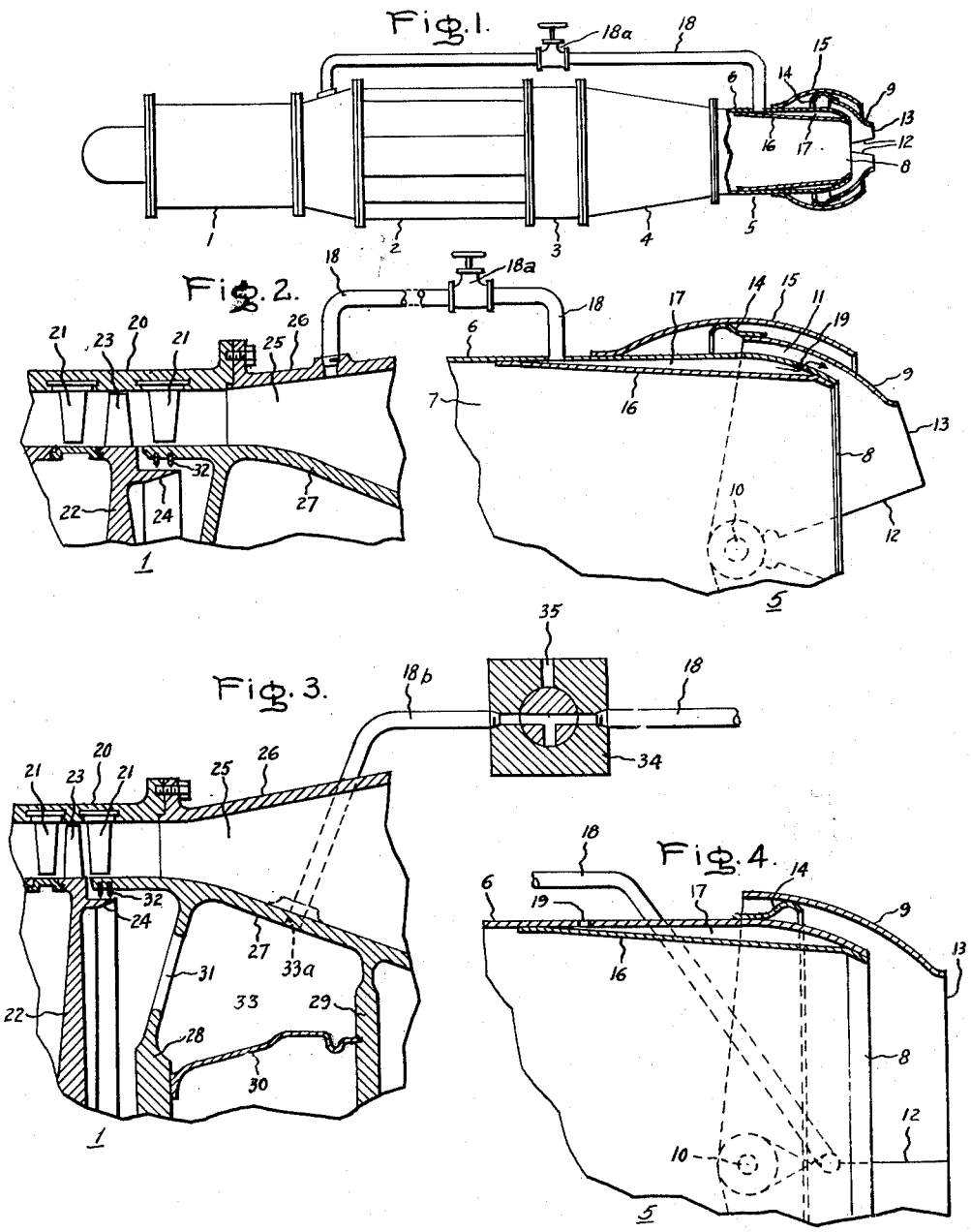

March 10, 1953 — E. WOLL — 2,630,673
COOLING MEANS FOR VARIABLE AREA NOZZLES
Filed Sept. 27, 1950

Inventor:
Edward Woll,
by Ernest C. Britton
His Attorney.

Patented Mar. 10, 1953

2,630,673

UNITED STATES PATENT OFFICE 2,630,673

COOLING MEANS FOR VARIABLE AREA NOZZLES

Edward Woll, Wenham, Mass., assignor to General Electric Company, a corporation of New York Application September 27, 1950, Serial No. 186,981

7 Claims. (Cl. 60—35.6)

1

This invention relates to fluid flow control means, and more particularly to improved cooling means for variable area nozzles for controlling fluid flow. It has found particular utility in connection with propulsion systems for jet-propelled aircraft, for example, in a propelling nozzle for such an aircraft employing a gas turbine type of powerplant and it is this application of the invention that I have elected specifically to illustrate and describe. It is to be understood, however, that the invention is not limited thereto, and it may be employed in any dynamic fluid system where it is desired to control the velocity of fluid discharged from a portion of the system, or to control pressure at particular locations in such a system.

Due to various conditions of operation that may be imposed upon a gas turbine type of powerplant, it may be necessary and desirable to vary the area of the propulsion nozzle. For example, a variable area nozzle may be employed in the interests of better efficiency, to provide a high rate of thrust change at constant rotational speed of the powerplant, and, among other things, to provide the amount of area variation required for reheat operation.

In powerplants of the type described, the gases discharged from the propelling nozzle are extremely hot and may exceed, for example, a temperature of 1500° F. during normal operation and a temperature of 3000 degrees F. during operation of the reheat system. Previously known variable nozzles are incapable of withstanding the destructive effects of such high temperatures with any reasonable life expectancy.

Accordingly, it is an object of this invention to provide a variable area nozzle in which the moving parts are cooled and insulated so as to be substantially protected from the harmful effects of the gas stream.

Another object is to provide improved sealing means for a nozzle of the type described of sufficient flexibility to care for local variations due to differentials in thermal expansion and to manufacturing tolerances.

Another object is to provide a variable area nozzle capable of withstanding the high temperatures which result from reheat system operation.

Other objects and advantages will be apparent from the description taken in connection with the following drawings in which Fig. 1 is a gas turbine powerplant for use in a jet-propelled aircraft; Fig. 2 is a detail view of the arrangement shown in Fig. 1 with portions of the powerplant

2 shown partly in section; Fig. 3 is a detail view also partly in section and showing a modified embodiment of the arrangement shown in Fig. 2; and Fig. 4 is another detail view showing a still further modified embodiment of the invention.

Referring now to Figs. 1, 2, the powerplant comprises a compressor section 1, a combustion chamber section 2, a turbine section 3 and an exhaust section 4 arranged in series flow relation. The constructional features of such a powerplant are not material to an understanding of the present invention and are described with greater particularity in a copending application in the name of Alan Howard, Serial No. 541,565, filed June 22, 1944, and assigned to the assignee of the present application. Gaseous motive fluid leaving turbine section 3 is conveyed through the exhaust section 4 and discharged to the ambient atmosphere at high velocity by a suitable propelling nozzle 5 which is suitably secured to the exhaust section 4. The exhaust section 4 may include a reheat system for augmenting the jet power output of the powerplant. The details of the reheat system are not material to an understanding of the present invention and, therefore, are not shown.

Nozzle 5 comprises a relatively thin sheet metal wall 6, which defines a substantially circular fluid passage 7 terminating in a discharge opening 8. An end portion of wall 6 adjacent to the discharge opening 8 forms a portion of a spherical surface as indicated in the drawings. Opposed U-shaped members 9 are rotatably supported by wall 6 on pivots 10 secured thereto. U-shaped members 9 also form portions of a spherical surface and are spaced from wall 6 to form a clearance space 11 therewith. Walls 9 are also constructed of relatively thin sheet metal and are formed by any well-known forming operation. After forming, each of the U-shaped members 9 is cut along a plane containing the axis of pivots 10 and the center of the spherical surface to form edge portions 12 and is also cut along a plane parallel to the axis of pivots 10 and normal to a radial line through the center of the spherical surface to form an edge portion 13 which is semicircular in cross-section. From a consideration of Fig. 2, it will be apparent to those skilled in art that the circular opening defined by the mating edge portions 13 when U-shaped members 9 are in the fully closed position is of smaller cross-section area than that of opening 8.

A flexible sealing member 14 is secured to U-shaped members 9 in order to prevent leakage through clearance space 11. Seal 14 makes rubbing contact with another spherical wall portion 15 secured to wall 6.

Actuating means, not material to an understanding of the present invention and therefore not shown, is provided for effecting limited rotation of U-shaped members 9 about pivots 10. It will be appreciated by those skilled in the art that any convenient type of actuating means can be employed to effect such rotation. For example, servomotors of either the electrical or hydraulic type can be employed, or, if desired, movement of members 9 can be manually adjusted by the use of any convenient arrangement of mechanical linkage members.

The fully closed position previously referred to is with edge portions 12 of the opposed U-shaped members in abutting relation so that semicircular edge portions 13 define a circular opening of smaller cross-section area than opening 8. As shown in Figs. 1, 2, nozzle 5 is in a partially open position. That is, U-shaped members 9 partially restrict opening 8 so that the effective flow area of the nozzle is less than the cross-sectional area of opening 8 and greater than the area of the opening formed by edge portions 13 with the nozzle in the fully closed position. In the fully open position of nozzle 5, opening 8 is unrestricted by U-shaped members 9 so that the effective area of nozzle 5 is the effective area of opening 8.

In order to provide a cooling passage and a stiffening means, an annular wall 16 is secured to the inner surfaces of wall 6, thus forming an annular cooling passage 17 surrounding the terminal end portion of central passage 7. A conduit 18 is provided for conveying cooling fluid from any suitable supply means to cooling passage 17. As illustrated in Fig. 2, the cooling fluid is obtained from a discharge flow passage of the compressor, for example, at a location between the compressor section 1 and the combustion chamber 2, and conduit 18 connects such a passage to the upstream end portion of cooling passage 17. Valve means 18a is connected in series flow relation with conduit 18 for shutting off the flow of cooling fluid during operation of the powerplant when cooling of nozzle 5 is not required. A plurality of openings 19 are provided to establish communication between passage 17 and clearance space 11 and thus provide a continuous path for the cooling fluid from conduit 18 to the atmosphere through passage 17, through opening 19, and through the clearance space 11.

In operation, the compressor section of the powerplant furnishes cooling fluid under pressure to cooling passage 17 through connecting conduit 18 and valve means 18a. The cooling fluid is thereby caused to flow across the surfaces of walls 6, 16, through cooling passage 17, and then through openings 19 into clearance space 11, thereby cooling walls 6, 16. After reaching clearance space 11, the cooling fluid then flows along the inner surfaces of U-shaped members 9, thus providing a cooling and insulating film of cooling fluid which protects movable members 9 from the harmful effects of the high temperature gases discharged from central passage 7 through opening 8. After flowing through clearance space 11 and along the inner surfaces of members 9, the cooling fluid mixes with and is discharged to the atmosphere with the gases discharged through opening 8.

Referring now to Fig. 3, a modification of the arrangement shown in Fig. 2 is shown wherein conduit 18 receives fluid for cooling from the compressor at a different pressure level and valve 34 replaces 18a. Nozzle 5 is as shown in Figs. 1 and 2 and like elements bear like notation. In Fig. 3, 20 represents a compressor casing carrying a plurality of stator blades 21. Rotatably supported within the casing are a plurality of rotors 22 carrying rotating blades 23. In the partial section shown in the drawing, only the last two rows of stator blades 21 are shown and only the last rotor 22 is shown. An axially extending portion or balance piston 24 of rotor 22 is provided, as indicated in the drawing, to form a close radial clearance with a seal 32 carried by wall 27. As is more particularly described in the above-mentioned copending application of Alan Howard, a compressor discharge passage 25 which connects the compressor to the combustion chamber section 2 is formed by annular walls 26, 27. Radially extending portions 28, 29 of wall 27 form support means for a bearing housing (not shown). An axially extending wall 30 is secured to radially extending wall portions 28, 29, thus forming two enclosed spaces defined by walls 22, 27, 28 and 29—30. These two spaces are connected by a plurality of openings 31 provided in radially extending portions 28, thus forming in effect a single chamber 33. High pressure fluid from the compressor leaks past seal 32 to provide a pressure at an intermediate value between compressor discharge pressure and the ambient pressure within the above-mentioned chamber for action against the balancing piston 24.

In the arrangement shown in Fig. 3, cooling fluid is supplied to passage 17 at a pressure level that is between ambient and the compressor discharge pressure by providing an opening 33a in wall 27 and connecting conduit 18b to said opening.

In such an arrangement a further modification is required over that shown in Fig. 2 since an increase in pressure in chamber 33 will greatly increase the axial load on rotor 22 and thus interfere with satisfactory operation of the gas turbine if this pressure exceeds a predetermined safe value. This is accomplished in accordance with the invention by providing the same variable area nozzle structure as described in connection with Fig. 2 and by replacing valve 18a with a modified valve 34 connected in series with conduit 18, 18b. In the position shown in the drawing, valve 34 establishes communication between chamber 33 and cooling passage 17. In another operating position of valve 34 (not shown) such communication is interrupted and the balance piston space is connected to the ambient atmosphere through a vent port 35. The sizes of conduit 18b, opening 33a, and port 35 are made sufficiently large to permit the flow past balance piston 24 and seal 32 to be discharged to the atmosphere without raising the pressure in chamber 33 above said predetermined value. Likewise, the aggregate area of openings 19 must also be large enough to avoid exceeding a safe pressure in chamber 33 when valve 34 is in the position shown in the drawing.

The operation of this embodiment of the invention is essentially the same as described in Fig. 2. During periods when cooling of nozzle 5 is desired, valve 34 is placed in the position shown in the drawing to establish communication between cooling passage 17 and the compressor balance piston chamber as previously described. During periods when cooling of the nozzle is not required, valve 34 is moved a quarter turn clockwise from the position shown to its other operating position, thus shutting off the flow of cooling air to nozzle 5 and connecting the balance piston chamber to the ambient atmosphere so that the intermediate pressure cannot exceed the above-mentioned predetermined value. This embodiment of the invention is particularly useful when exhaust reheat jet augmentation system is employed. In such case, the movable portions 9 of nozzle 5 may be in their fully closed position when the reheater is not in operation and will therefore form the maximum restriction possible to the flow of exhaust gases from central passage 7 to the atmosphere. Under such conditions, the pressure within passage 7 may rise to an appreciable amount above the pressure of the ambient atmosphere which would tend to cause the balance piston pressure to exceed its predetermined value if cooling passage 17 were connected to the balance piston chamber. However, under such an operating condition, the temperature of the gases flowing in central passage 7 is relatively low so that cooling of the variable nozzle 5 is not required. Therefore, chamber 33 is connected to the atmosphere through port 35 in the manner previously described to prevent excessive pressure. During operation of the reheat system, the movable portions 9 of nozzle 5 will be opened to a substantial degree, thereby decreasing the restriction and reducing the tendency for the pressure in chamber 33 from exceeding the predetermined safe value. During reheat operation, the temperature of the gases in exhaust passage 7 is extremely high, thus requiring cooling of the nozzle in which case valve 34 may be moved to the position shown in Fig. 3 to provide cooling fluid to passage 17 in the manner previously described.

Fig. 4 is still another embodiment of the invention in which cooling of the nozzle is provided at all times during operation of the powerplant and the balance piston pressure is prevented from exceeding its predetermined value. This arrangement differs from those previously described in that valve means 18a and 34 are omitted, the location of openings 19 and the location at which conduit 18 is connected to passage 17 are changed, and sealing member 14 is carried by wall 6 instead of movable member 9. In this embodiment, cooling fluid is introduced to passage 17 at the downstream end thereof and substantially adjacent to opening 8, in other words, between opening 8 and the sealing member 14. Discharge openings 19 are located at the upstream end of passage 17 and substantially adjacent to the location at which wall 16 is secured to wall 6. In this location openings 19 connect cooling passage 17 directly to the ambient atmosphere. In Fig. 4, nozzle 5 is shown in the fully closed position. The limits of the fully open and fully closed positions are as described in connection with Figs. 1, 2.

In operation, fluid is furnished at all times during operation of the powerplant from the balance piston chamber 33 through opening 33a to the downstream end portion of cooling passage 17 through conduit 18. Since the fluid is at a pressure greater than that of the ambient atmosphere, it flows upstream along the surfaces of walls 6, 16, thereby cooling the nozzle. Since cooling passage 17 is directly connected to the ambient atmosphere at all times, there will be no tendency for the balance piston pressure to exceed the predetermined value.

Thus, it will be seen that the invention provides a variable area nozzle that is cooled and insulated from the harmful effects of a high temperature fluid stream, mechanically simple, relatively easy to manufacture, and is light in weight, and is thus particularly suitable for aircraft service.

While particular embodiments of the invention have been illustrated and described, it will be apparent to those familiar with the art that various changes and modifications may be made without departing from the invention, and it is intended to cover in the appended claims all such changes and modifications that come within the true spirit and scope of the invention.

What I claim as new and desire to secure by Letters Patent of the United States is:

1. A variable area fluid nozzle for use at elevated temperatures comprising first conduit means having a discharge end portion, at least two movable members spaced from and pivotally supported by said conduit means and surrounding said end portion for variably controlling the flow of fluid discharged therefrom, sealing means for preventing leakage of fluid between the conduit means and said movable members, means for cooling said nozzle including means for supplying cooling fluid under pressure, walls secured to said conduit means at locations adjacent to said end portion to define a cavity, said first conduit means defining at least one opening therein between said sealing means and said end portion and communicating with said cavity, and second conduit means connecting said cavity to said cooling fluid supply means.

2. A variable area nozzle of the clamshell type for variably controlling the flow of fluids at elevated temperatures comprising a first annular wall defining a conduit and having a discharge opening, the outer surface of said wall forming a portion of a sphere adjacent to said opening, a pair of movable clamshell members rotatably supported by said wall and adapted for limited rotation with respect to an axis which includes the center of said spherical surface, the inner surfaces of said clamshell members being spaced from said spherical surface to form a clearance space, sealing means for minimizing leakage of fluid from said clearance space to the atmosphere, means for cooling said nozzle including means for supplying cooling fluid under pressure, a second annular wall secured to the inner surfaces of the first wall to form a cavity adjacent to said opening, said first wall defining at least one opening communicating between said cavity and said clearance space and at least one other opening communicating with said cavity, and conduit means connecting said other opening to said supply means.

3. A variable area nozzle of the clamshell type for variably controlling the flow of a fluid at an elevated temperature comprising a first wall portion defining an inlet and a discharge opening, opposed U-shaped wall portions defining portions of a spherical surface surrounding said first wall portion and defining a clearance space therewith, said U-shaped portions being rotatably supported by said first wall portion and arranged for limited rotation relative thereto and with respect to an axis normal to the axis thereof and including the center of said spherical surface, sealing means spaced from said discharge opening for preventing leakage of fluid through said clearance space, means for cooling said nozzle including means for supplying cooling fluid under pressure, an annular wall secured to the surfaces of said first wall portion substantially at the plane of said discharge opening and at a location axially spaced upstream from said sealing means to form an axially extending annular passageway, said first wall portion defining a plurality of openings between the plane of said discharge opening and said sealing means for establishing communication between said passageway and said clearance space, and conduit means connecting said passageway to said supply means.

4. In a gas turbine powerplant having a compressor and an exhaust conduit, a clamshell type variable area fluid nozzle connected to the exhaust conduit, said nozzle comprising a first wall portion defining a first fluid passageway and having an end portion defining a discharge opening communicating with said passageway, opposed U-shaped wall portions surrounding said first wall portion and defining a clearance space therewith, said U-shaped wall portions being rotatably supported by said first wall portion and adapted for limited rotation with respect to an axis normal to the axis of said passageway, sealing means axially spaced upstream from the plane of said discharge opening for preventing leakage of fluid through said clearance space, means for cooling said nozzle including a second wall secured to the first wall portion and defining therewith an annular cooling passageway surrounding said first passageway and extending substantially from the plane of said discharge opening to a location axially spaced upstream from said sealing means, means establishing communication between said cooling passageway and said clearance space, and conduit means connecting said cooling passage to the compressor.

5. In a gas turbine powerplant having an exhaust conduit and a compressor with a discharge flow passage, a variable area nozzle connected to the exhaust conduit and comprising first walls defining a central flow passage surrounded by an annular cooling passage, opposed U-shaped walls surrounding said first walls and defining a clearance space therewith, said U-shaped walls being rotatably supported by said first walls for limited rotation with respect to an axis normal to the longitudinal axis of said central passage, sealing means for preventing fluid leakage through said clearance space, said first walls also defining an opening spaced downstream from said sealing means establishing communication between said cooling passage and said clearance space, and conduit means connecting said cooling passage to said compressor discharge passage.

6. In a gas turbine powerplant having an exhaust conduit and a compressor with a discharge flow passage, a variable area nozzle connected to said exhaust conduit, said nozzle comprising a first wall defining a first fluid passageway and having an end portion defining an opening for discharging motive fluid from said exhaust conduit, opposed U-shaped wall portions surrounding said first wall portion and defining a clearance space therewith, said U-shaped wall portions being rotatably supported by said first wall portion for limited rotation about an axis normal to the longitudinal axis thereof, for restricting the flow area of the nozzle in at least one position, means axially spaced from said opening for preventing the outward leakage of fluid through said clearance space, means for cooling said nozzle including a second wall spaced from said first wall and having an end portion secured thereto and substantially at the plane of said discharge opening and another end portion secured to the first wall at a location at the upstream side of said sealing means, said first wall defining an opening communicating between said clearance space and the space enclosed between said first and second walls, and conduit means including flow regulating means and connecting said supply means to said enclosed space at a location upstream from said sealing means.

7. In a gas turbine powerplant having an exhaust conduit and a compressor with a chamber containing a balance piston, a variable area nozzle connected to the exhaust conduit and comprising first walls defining a central flow passage surrounded by an annular cooling passage, opposed U-shaped walls surrounding said first walls and defining a clearance space therewith, said U-shaped walls being rotatably supported by said first walls for limited rotation with respect to an axis normal to the longitudinal axis of said central passage, sealing means for preventing fluid leakage through said clearance space, said first walls defining at least one opening spaced upstream from said sealing means connecting said cooling passage to the ambient atmosphere, and conduit means connecting said balance piston chamber to said cooling passage at a location downstream from said sealing means.

EDWARD WOLL.

REFERENCES CITED

The following references are of record in the file of this patent:

UNITED STATES PATENTS

| Number | Name | Date |
|---|---|---|
| 2,501,633 | Price | Mar. 21, 1950 |
| 2,523,842 | Oulianoff | Sept. 26, 1950 |
| 2,551,372 | Haltenberger | May 1, 1951 |

FOREIGN PATENTS

| Number | Country | Date |
|---|---|---|
| 587,513 | Great Britain | Apr. 29, 1947 |